US012587106B2

(12) United States Patent (10) Patent No.: US 12,587,106 B2
Huang et al. (45) Date of Patent: Mar. 24, 2026

(54) SYNCHRONOUS RECTIFICATION CONTROLLER APPLIED TO POWER CONVERTER AND START-UP METHOD FOR THE SAME IN START-UP STAGE

(71) Applicant: Ark HDPS Semiconductor Pte. LIMITED., Singapore (SG)

(72) Inventors: Yu-Yun Huang, Shenzhen (CN); Yi-Lun Shen, Shenzhen (CN)

(73) Assignee: Ark HDPS Semiconductor Pte. LIMITED., Singapore (SG)

( * ) Notice: Subject to any disclaimer, the term of this patent is extended or adjusted under 35 U.S.C. 154(b) by 99 days.

(21) Appl. No.: 18/520,035

(22) Filed: Nov. 27, 2023

(65) Prior Publication Data

US 2024/0235407 A1 Jul. 11, 2024

(30) Foreign Application Priority Data

Jan. 10, 2023 (CN) .......................... 202310035006.1

(51) Int. Cl.
*H02M 3/335* (2006.01)
*H02M 1/36* (2007.01)
(52) U.S. Cl.
CPC ......... *H02M 3/33592* (2013.01); *H02M 1/36* (2013.01)
(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 8,520,414 B2 * 8/2013 Garrity ............. H02M 3/33569
363/21.14
10,523,110 B2 * 12/2019 Tao ......................... H02M 1/08
(Continued)

FOREIGN PATENT DOCUMENTS

CN 101521463 A 9/2009
CN 105281578 A 1/2016
(Continued)

OTHER PUBLICATIONS

Office Action dated Apr. 24, 2024 of the corresponding Taiwan patent application No. 112134711.

*Primary Examiner* — Jeffrey A Gblende
(74) *Attorney, Agent, or Firm* — MUNCY, GEISSLER, OLDS & LOWE, P.C.

(57) ABSTRACT

A synchronous rectification controller is coupled to a rectification switch at a secondary-side of a power converter, and the rectification switch includes a rectification switch control, first, and second terminal. The synchronous rectification controller includes a driving signal terminal, a power receiving terminal, a transistor, and a start-up control module. The power receiving terminal receives an operating voltage, and when the operating voltage is higher than an operating voltage threshold, the synchronous rectification controller can output a driving signal for driving the rectification switch through the driving signal terminal. When the operating voltage is lower than the operating voltage threshold, the start-up control module limits a cross voltage between the rectification switch control terminal and the rectification switch second terminal to be lower than a first threshold voltage of the rectification switch by turning on the transistor to prevent conduction of the rectification switch.

12 Claims, 9 Drawing Sheets

(58) Field of Classification Search
CPC ...... H02M 3/28; H02M 3/01; H02M 3/33569;
H02M 3/33507; H02M 2007/4815; H02M
2007/4818; H02M 1/083; H02M 3/33538;
H02M 3/33546; H02M 3/33515; H02M
3/33576; H02M 3/33592; H02M 3/33553;
H02M 3/33523; H02M 3/33561; H02M
3/155; H02M 3/1582; H02M 1/4233;
H02M 1/12; H02M 3/07; H02M 7/219;
H02M 7/4815; H02M 1/0048; H02M
7/4818; H02M 7/4826; H02M 7/4833;
Y02B 70/1491
See application file for complete search history.

(56) References Cited

U.S. PATENT DOCUMENTS

| | | | | |
|---|---|---|---|---|
| 11,245,327 | B2 * | 2/2022 | Feng ........................ | H02M 1/08 |
| 11,489,451 | B1 * | 11/2022 | Liu ................... | H02M 3/33592 |
| 11,621,646 | B2 * | 4/2023 | Zong ....................... | H02M 1/08 |
| | | | | 363/21.14 |
| 2010/0182806 | A1 | 7/2010 | Garrity et al. | |
| 2020/0389082 | A1 | 12/2020 | Feng et al. | |
| 2021/0376745 | A1 | 12/2021 | Zong et al. | |

FOREIGN PATENT DOCUMENTS

| | | |
|---|---|---|
| CN | 108347171 A | 7/2018 |
| CN | 111786563 A | 10/2020 |
| CN | 114513114 A | 5/2022 |
| TW | 201206030 A | 2/2012 |

* cited by examiner

SYNCHRONOUS RECTIFICATION CONTROLLER APPLIED TO POWER CONVERTER AND START-UP METHOD FOR THE SAME IN START-UP STAGE

BACKGROUND

Technical Field

The present disclosure relates to a synchronous rectification controller and a start-up method for the same, and more particularly to a synchronous rectification controller applied to a power converter and a star-up method for the same in a start-up stage.

Description of Related Art

The statements in this section merely provide background information related to the present disclosure and do not necessarily constitute prior art.

Due to the rapid development of the information industry in recent years, power supplies play an important role. In particular, the power required by large-scale information equipment is gradually increasing, and therefore the output power of the power supply gradually increases based on the load requirements. In particular, the circuit inside the power supply that mainly performs power conversion is a power converter. The main function of the power converter is to convert an input voltage into an output voltage, and provide a stable output voltage for load operation. There are usually several switches and at least one power inductor inside the power converter. An internal controller interleavedly turns on and turns off several switches to store and release energy in the power inductor to control the power converter to convert the input voltage to the output voltage.

Please refer to FIG. 1, which shows a block circuit diagram of a related-art power converter. The power converter 100 includes a primary-side circuit 100-1, a secondary-side circuit 100-2, a transformer 100-3, a main controller 1, a rectification switch SR, and a synchronous rectification controller 2. The main controller 1 is used to control the switching of the power switch Q to convert an input voltage Vin. The synchronous rectification controller 2 synchronously control the switching of the rectification switch SR based on the switching of the power switch Q so that the power converter 100 provides an output voltage Vo to supply power to a load 200. When the power converter 100 is in a start-up state of just receiving the input voltage Vin and components inside of the power converter 100 are ideal, the synchronous rectification controller 2 will not output a driving signal S_DR to turn on the rectification switch SR. However, when the components inside the power converter 100 are non-ideal, there is a parasitic capacitance Cgd between a drain D and a gate G of the rectification switch SR. Therefore, when part of the energy of the primary-side circuit 100-1 is coupled to the secondary-side circuit 100-2 through the transformer 100-3, the parasitic capacitance Cgd may be charged so as to cause the voltage at a rectification switch control terminal G to rise. As a result, when the power converter 100 is in the start-up state after just receiving the input voltage Vin, the rectification switch SR is affected by the parasitic capacitance Cgd and is mistakenly turned on.

In order to prevent the rectification switch SR from being mistakenly turned on due to the influence of the parasitic capacitance Cgd when the power converter 100 has just received the input voltage Vin, the conventional manner is to use a predetermined voltage to adjust a dead time so as to lock the rectification switch SR during the dead time to avoid the rectification switch SR being mistakenly turned on. Alternatively, a current source is used to charge an energy storage component, and when the energy storage component is not charged to a predetermined voltage, the rectification switch SR is locked so as to avoid the rectification switch SR being mistakenly turned on. However, the above-mentioned dead time adjustment or the method of charging the energy storage component by the current source requires that the synchronous rectification controller 2 is already completely in operation (or partially in operation). Therefore, the conventional method of preventing the rectification switch SR from being mistakenly turned on may still cause the rectification switch SR to be mistakenly turned on once the synchronous rectification controller 2 is not yet in operation.

Therefore, how to design a synchronous rectification controller applied to a power converter and a start-up method for the same in a start-up stage to solve the problems and technical bottlenecks in the existing technology has become a critical topic in this field so that when the synchronous rectification controller is not in operation, it can still control a cross voltage between the gate and the source of the rectification switch and lock it in an off state while the power converter is in the star-tup state, thereby preventing the rectification switch from being affected by parasitic capacitance to be mistakenly turned on.

SUMMARY

In order to solve the above-mentioned problem, the present disclosure provides a synchronous rectification controller applied to a power converter. The synchronous rectification controller is coupled to a rectification switch at a secondary side of the power converter. The rectification switch includes a rectification switch control terminal, a rectification switch first terminal, and a rectification switch second terminal. The synchronous rectification controller includes a driving signal terminal, a power receiving terminal, a transistor, and a start-up control module. The driving signal terminal is coupled to the rectification switch control terminal. The power receiving terminal receives an operating voltage, wherein when the operating voltage is higher than an operating voltage threshold, the synchronous rectification controller outputs a driving signal through the driving signal terminal. The transistor includes a transistor first terminal, a transistor second terminal, and a transistor control terminal. The transistor first terminal is coupled to the rectification switch control terminal, and the transistor second terminal is coupled to the rectification switch second terminal. The start-up control module is coupled to the transistor control terminal and the power receiving terminal, and wherein when the operating voltage is lower than the operating voltage threshold, the transistor is turned on and a cross voltage between the rectification switch control terminal and the rectification switch second terminal is lower than a first threshold voltage of the rectification switch to prevent conduction of the rectification switch.

In order to solve the above-mentioned problem, the present disclosure provides a start-up method for a rectification switch of a power converter in a start-up stage. The rectification switch is coupled to a secondary side of the power converter, and the rectification switch includes a rectification switch control terminal, a rectification switch first terminal, and a rectification switch second terminal. The start-up method includes steps of: receiving an operating voltage, and limiting a cross voltage across the rectification switch control terminal and the rectification switch second terminal to be lower than a first threshold voltage of the rectification switch by turning on a transistor when the operating voltage is lower than an operating voltage threshold; normally turning off the transistor when the operating voltage is higher than the operating voltage threshold; and driving the rectification switch to be turned on by a driving signal provided by a driving circuit.

The main purpose and effect of the present disclosure is to limit the cross voltage between the rectification switch control terminal and the rectification switch second terminal to be lower than the first threshold voltage of the rectification switch by turning on the transistor when the operating voltage is lower than the operating voltage threshold. Therefore, the cross voltage of the rectification switch can be locked in the off state while the power converter is in the start-up state, thus preventing the rectification switch from being affected by the parasitic capacitance and from being mistakenly turned on.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
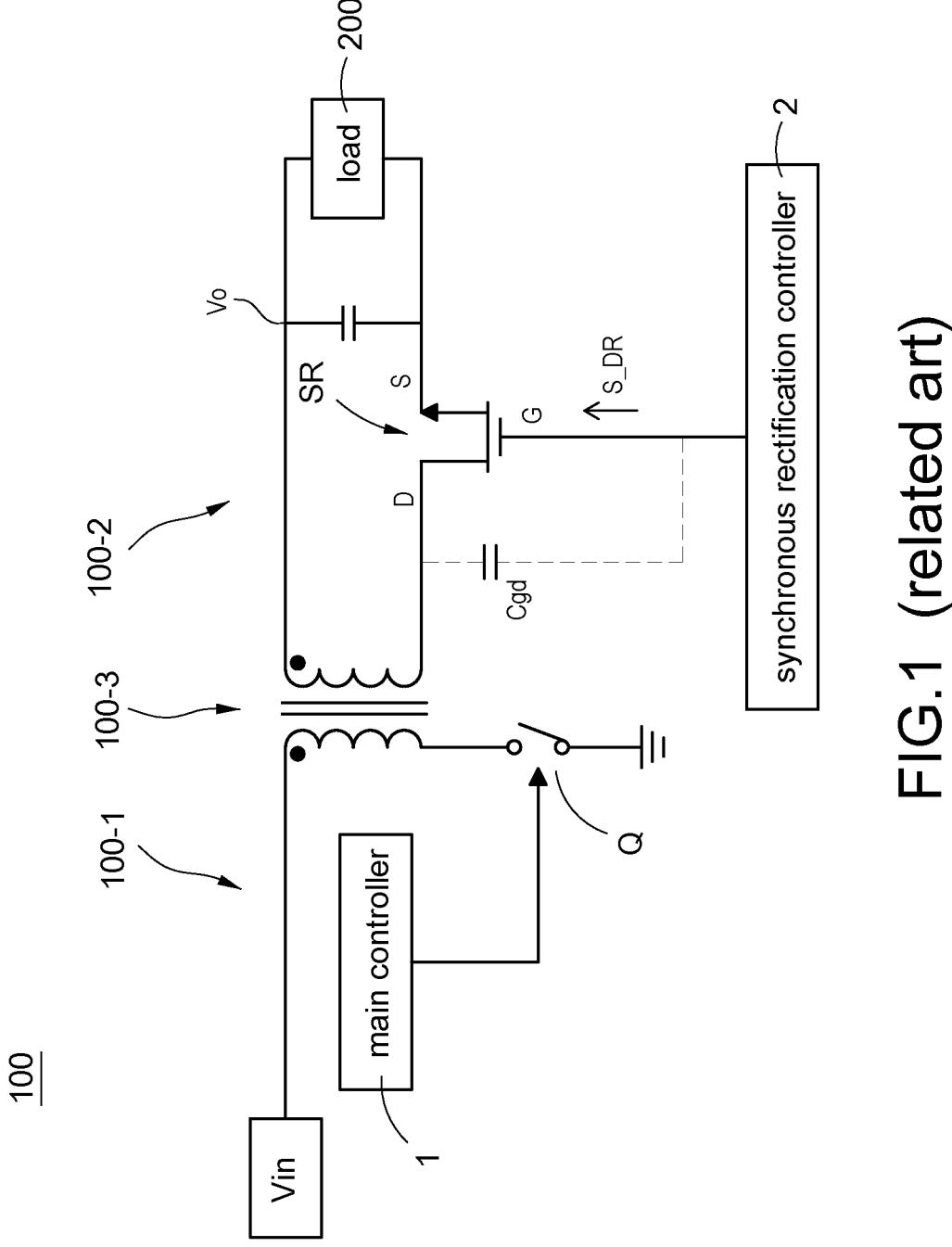
FIG. 1 is a block circuit diagram of a related-art power converter.

Reference will now be made to the drawing figures to describe the present disclosure in detail. It will be understood that the drawing figures and exemplified embodiments of present disclosure are not limited to the details thereof.

Figure 2:
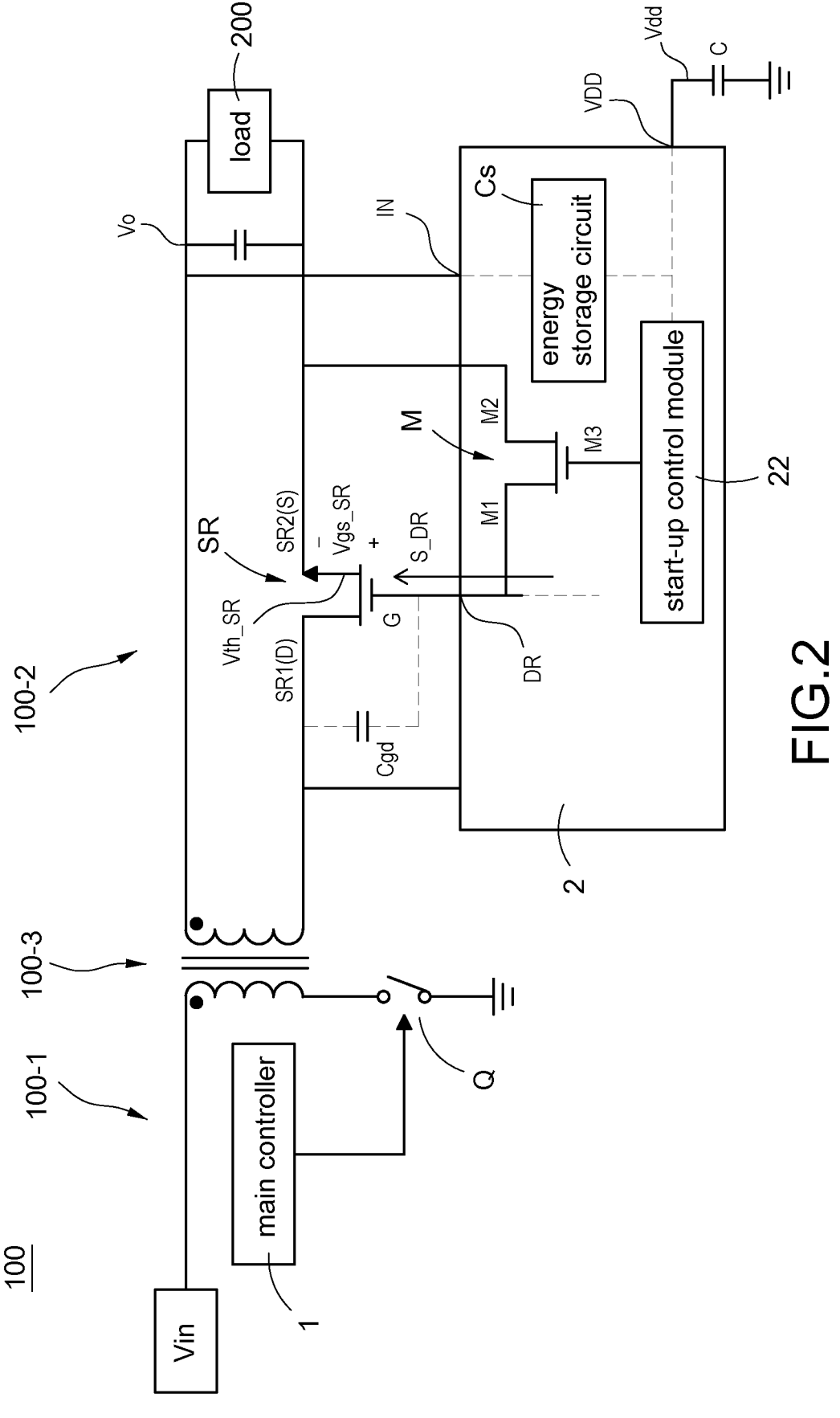
FIG. 2 is a block circuit diagram of a power converter having a synchronous rectification controller according to the present disclosure.

Please refer to FIG. 2, which shows a block circuit diagram of a power converter having a synchronous rectification controller according to the present disclosure. The power converter 100 receives an input voltage Vin, and is coupled to a load 200. The power converter 100 includes a primary-side circuit 100-1, a secondary-side circuit 100-2 isolated from the primary-side circuit 100-1, a transformer 100-3, and a main controller 1. The transformer 100-3 is coupled between the primary-side circuit 100-1 and the secondary-side circuit 100-2. The main controller 1 is coupled to a power switch Q at the primary-side circuit 100-1, and the main controller 1 is used to control the switching of the power switch Q to convert the input voltage Vin so that the primary-side circuit 100-1 provides the converted energy to the secondary-side circuit 100-2 through the transformer 100-3. The power converter 100 further includes a synchronous rectification controller 2, and the secondary-side circuit 100-2 includes a rectification switch SR.

The rectification switch SR is coupled between the transformer 100-3 and an output terminal of the power converter 100, and the synchronous rectification controller 2 is coupled to the rectification switch SR. The synchronous rectification controller 2 synchronously controls the switching of the rectification switch SR based on the switching of the power switch Q so as to convert the energy of the transformer 100-3 into an output voltage Vo so that the secondary-side circuit 100-2 provides the output voltage Vo to supply power to the load 200. Specifically, in one embodiment, the rectification switch SR is a MOSFET having a rectification switch control terminal G, a rectification switch first terminal SR1, and a rectification switch second terminal SR2, and the three terminals are respectively a gate, a drain, and a source. The synchronous rectification controller 2 includes a driving signal terminal DR, a power receiving terminal IN, a power terminal VDD, and an energy storage circuit Cs. The driving signal terminal DR is coupled to the rectification switch control terminal G.

The power receiving terminal IN is coupled to the output terminal of the power converter 100 to receive the output voltage Vo. The energy storage circuit Cs is coupled to the power receiving terminal IN and the power terminal VDD, and converts the output voltage Vo into an operating voltage Vdd. The power terminal VDD is coupled to the energy storage circuit Cs and a capacitor C. The capacitor C is used to store the operating voltage Vdd and provides the operating voltage Vdd required for the synchronous rectification controller 2 in operation. In particular, the energy storage circuit Cs, for example, but not limited to, a low-dropout regulator (LDO). Moreover, the configuration of the power receiving terminal IN and the energy storage circuit Cs is only to charge the capacitor C and build the operating voltage Vdd, and therefore the circuit structure of FIG. 2 (shown by dotted lines) is not limited. Any circuit configuration that can charge the capacitor C and build the operating voltage Vdd should be included in the scope of this embodiment.

When the power converter 100 does not receive the input voltage Vin, the operating voltage Vdd required for the synchronous rectification controller 2 in operation has not been built, and the power converter 100 does not start operating at this time. During a transient period when the power converter 100 starts to receive the input voltage Vin, each energy storage component in the power converter 100 starts to store energy, thereby causing the voltage of the energy storage component to start to rise (for example, from 0V to 12V). However, during the transient period, the voltage of each energy storage component is still gradually rising, and a stable operating voltage Vdd has not yet been built. Therefore, the power terminal VDD of the synchronous rectification controller 2 has not yet received a high enough operating voltage Vdd and is still unable to operate normally. However, the input voltage Vin has been supplied to the primary-side circuit 100-1, and part of the energy can also be coupled to the secondary-side circuit 100-2 through the transformer 100-3. Therefore, this transient state is also referred to as a start-up state of the power converter 100. After each energy storage component builds a stable and normal operating voltage Vdd, the main controller 1 and the synchronous rectification controller 2 can be completely driven, and the main controller 1 and the synchronous rectification controller 2 can control the power converter 100 convert the input voltage Vin into the output voltage Vo. Therefore, this steady state is also referred to as a normal operation state of the power converter 100.

Similarly, when the power converter 100 is in the start-up state, although the operating voltage Vdd is gradually rising, it is lower than an operating voltage threshold set by the synchronous rectification controller 2. Therefore, the synchronous rectification controller 2 is not completely driven and cannot operate normally. On the contrary, when the power converter 100 is in the normal operation state, the operating voltage Vdd is higher than the operating voltage threshold so that the synchronous rectification controller 2 can be completely driven and can output a driving signal S_DR to the rectification switch control terminal G through the driving signal terminal DR so as to turn on the rectification switch SR by the driving signal S_DR. In particular, the operating voltage threshold may preferably be set at a potential of an under-voltage protection (UVP) of the synchronous rectification controller 2. That is because the synchronous rectification controller 2 can usually operate normally when the operating voltage Vdd is higher than the potential of the under-voltage protection (UVP). On the contrary, the synchronous rectification controller 2 usually enters the under-voltage protection (UVP) when the operating voltage Vdd is lower than the potential of the under-voltage protection (UVP). However, it is not limited to this. it can be set, for example but not limited to, higher than the potential of the under-voltage protection (UVP) so that the synchronous rectification controller 2 has dual protection capabilities.

Therefore, in order to avoid the above-mentioned situation, the main feature and effect of the present disclosure are that the synchronous rectification controller 2 further includes a transistor M and a start-up control module 22. The transistor M includes a transistor first terminal M1, a transistor second terminal M2, and a transistor control terminal M3. The transistor first terminal M1 is coupled to the rectification switch control terminal G, and the transistor second terminal M2 is coupled to the rectification switch second terminal SR2, i.e., the source S. The start-up control module 22 is coupled to the transistor control terminal M3 and the power terminal VDD. When the operating voltage Vdd is lower than the operating voltage threshold, a cross voltage Vgs_SR between the rectification switch control terminal G and the rectification switch second terminal SR2 is limited to be lower than a first threshold voltage Vth_SR of the rectification switch SR, i.e., a critical voltage Vth of the rectification switch SR by turning on the transistor M. Therefore, the cross voltage Vgs_SR of the rectification switch SR will not be higher than the first threshold voltage Vth_SR and locked in an off state while the power converter 100 is in the start-up state, thereby preventing the rectification switch SR from being mistakenly turned on due to the influence of a parasitic capacitance Cgd. On the contrary, when the power converter 100 is in the normal operation state, the operating voltage Vdd is higher than the operation voltage threshold so that the synchronous rectification controller 2 normally turns off the transistor M to prevent the transistor M from being mistakenly turned on to cause the rectification switch SR to be mistakenly turned on or turned off. The synchronous rectification controller 2 can generally provide the driving signal S_DR to selectively turn on the rectification switch SR based on the cross voltage between the rectification switch first terminal SR1 and the rectification switch second terminal SR2 of the rectification switch SR to synchronously control the switching of the rectification switch SR.

Figure 3A:
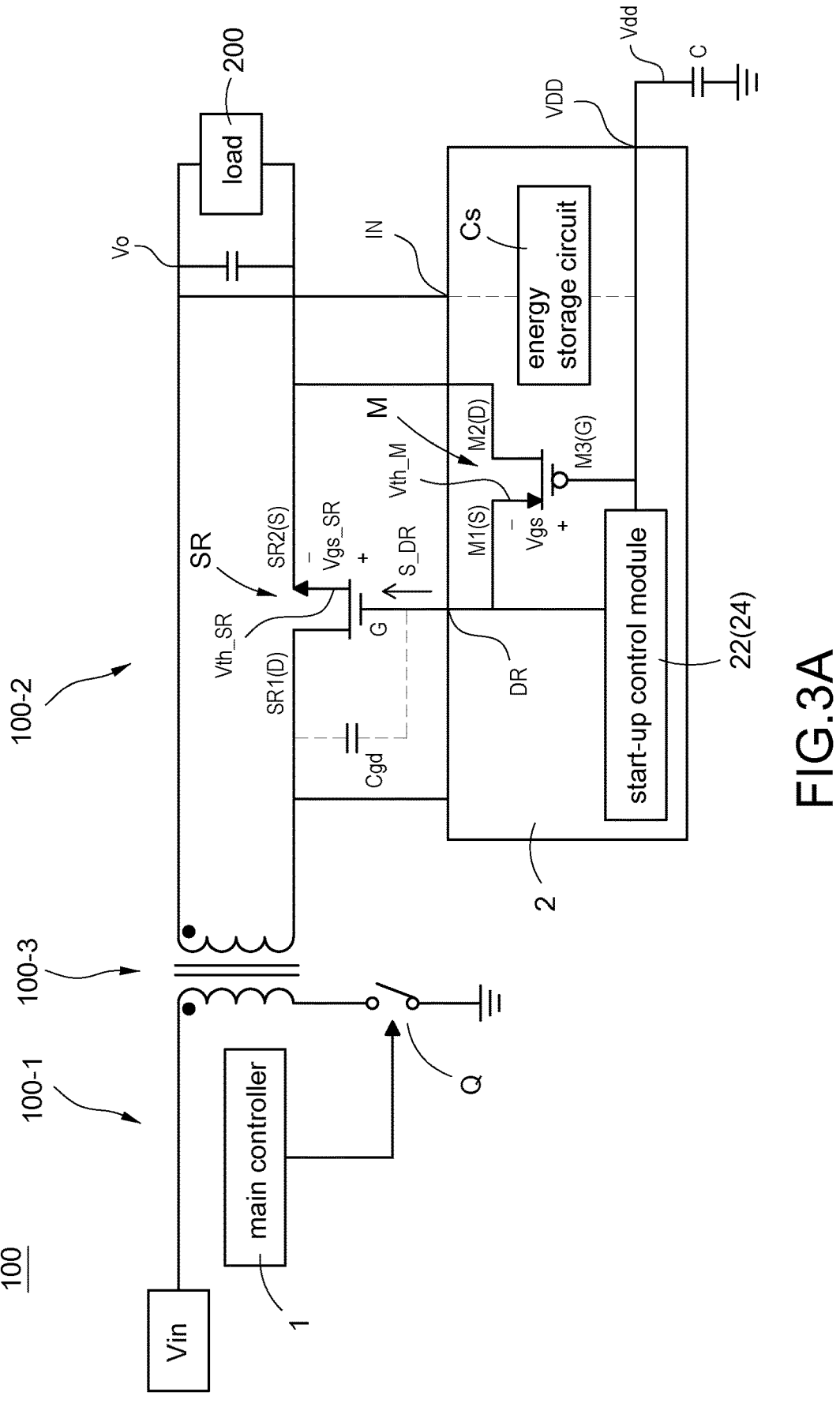
FIG. 3A is a block circuit diagram of the power converter having the synchronous rectification controller according to a first embodiment of the present disclosure.
Figure 3B:
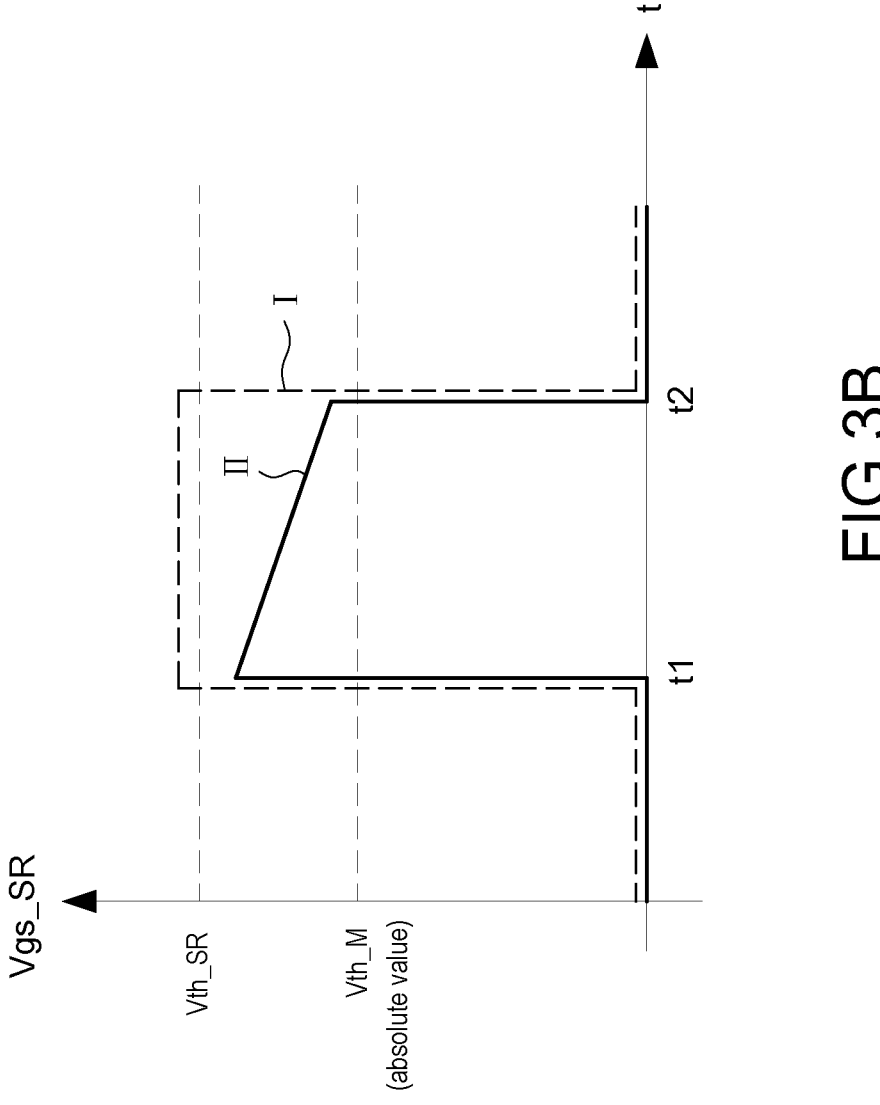
FIG. 3B is a waveform diagram of the power converter in operation shown in FIG. 3A.

Please refer to FIG. 3A, which shows a block circuit diagram of the power converter having the synchronous rectification controller according to a first embodiment of the present disclosure; please refer to FIG. 3B, which shows a waveform diagram of the power converter in operation shown in FIG. 3A, and also refer to FIG. 2. As shown in FIG. 3A, the transistor M is a p-channel transistor, and the start-up control module 22 is a driving circuit 24 of providing the driving signal S_DR. The transistor first terminal M1 (i.e., the source S) is coupled to the rectification switch control terminal G, and the transistor second terminal M2 (i.e., the drain D) is coupled to the rectification switch second terminal SR2 (i.e., the source S). The driving circuit 24 is coupled to the rectification switch control terminal G through the driving signal terminal DR, and a first terminal of the driving circuit 24 is coupled to the power terminal VDD and the transistor control terminal M3 (i.e., the gate G). When the operating voltage Vdd is lower than the operating voltage threshold, the driving circuit 24 cannot provide the driving signal S_DR to drive the rectification switch SR to be turned on. On the contrary, when the operating voltage Vdd is higher than the operating voltage threshold, the driving circuit 24 can provide the driving signal S_DR to drive the rectification switch SR to be turned on.

On the other hand, when the operating voltage Vdd is lower than the operating voltage threshold, the transistor M is turned on or turned off by itself based on voltage differences between the terminals of the transistor M. When part of the energy of the input voltage Vin is coupled to the secondary-side circuit 100-2 to cause the voltage at the rectification switch first terminal SR1 (i.e., the drain D) to rise and the voltage at the rectification switch control terminal G to rise through the parasitic capacitance Cgd of the rectification switch SR, the voltage at the transistor first terminal M1 (i.e., the source S) rises. When a voltage difference Vgs (i.e., Vg–Vs) between the transistor control terminal M3 (i.e., the gate G) and the transistor first terminal M1 (i.e., the source S) is lower than a second threshold voltage Vth_M of the p-channel transistor M, i.e., a critical voltage Vth of the p-channel transistor M, the transistor M is turned on so that the voltage at the rectification switch control terminal G falls. Therefore, this avoids the situation where the cross voltage Vgs_SR between the rectification switch control terminal G and the rectification switch second terminal SR2 (i.e., the source S) is mistakenly higher than the first threshold voltage Vth_SR of the rectification switch SR, thereby causing the rectification switch SR to be mistakenly turned on.

As shown in FIG. 3B, the cross voltage Vgs_SR between the rectification switch control terminal G and the rectification switch second terminal SR2 (i.e., the source S) is shown. The dotted-line waveform I is the cross voltage Vgs_SR waveform of the rectification switch SR before the start-up control module 22 is added. In which, the rectification switch control terminal G is affected by the parasitic capacitance Cgd, which may cause the rectification switch SR to be mistakenly turned on. The solid-line waveform II is the wave of the rectification switch control terminal G after the start-up control module 22 is added in FIG. 3A. During time t1 and time t2, the operating voltage Vdd has not yet been built, and the cross voltage Vgs_SR of the rectification switch SR is affected by the primary-side circuit 100-1 (for example, but not limited to, turning on or turning off the power switch Q). In this situation, the cross voltage Vgs_SR rises due to the coupling of part of the energy of the transformer 100-3. In order to avoid the situation that when the voltage difference Vgs of the transistor M has not yet been lower than the second threshold voltage Vth_M of the transistor M but the cross voltage Vgs_SR of the rectification switch SR is already higher than the first threshold voltage Vth_SR to cause the rectification switch SR to be turned on, in the selection of components, an absolute value of the second threshold voltage Vth_M of the transistor M needs to be lower than the first threshold voltage Vth_SR of the rectification switch SR. As shown at time t1 in FIG. 3B, the difference between the absolute value of the second threshold voltage Vth_M and the first threshold voltage Vth_SR can prevent the rectification switch SR from being turned on first.

For example, the second threshold voltage Vth_M of the p-channel transistor M may be selected to be −2V, and the first threshold voltage Vth_SR of the rectification switch SR may be selected to be 3V. When the operating voltage Vdd and the rectification switch second terminal SR2 (i.e., the source S) are both 0V, and the voltage at the rectification switch control terminal G rises to 2.2V as the voltage at the rectification switch first terminal SR1 (i.e., the drain D) rises, the voltage difference Vgs_M of the p-channel transistor M is −2.2V, which is already lower than −2V and causes the p-channel transistor M to be turned on. Therefore, the voltage difference Vgs_SR of the rectification switch SR will only rise to a maximum of 2.2V, and will gradually decrease as the p-channel transistor M turns on. Also, the entire process will be lower than 3V so that the rectification switch SR remains turned off.

On the other hand, since the transistor M is the p-channel transistor, when the operating voltage Vdd is lower than the operating voltage threshold, for example, close to 0V, the control voltage Vgs_SR of the rectification switch SR decreases although the transistor M remains turned on between time t1 and time t2. However, when the voltage at the rectification switch control terminal G (i.e., the first terminal M1 (the source S) of the p-channel transistor M, approaches the 0V of the second terminal M2 (the drain D) of the transistor M so that the voltage difference Vgs_M of the p-channel transistor M is no longer lower than the second threshold voltage Vth_M, for example from −2.2 to −2V. In this situation, the p-channel transistor M is turned off and can no longer decrease the voltage at the rectification switch control terminal G. Therefore, between time t1 and time t2, although the voltage at the rectification switch control terminal G will fall, it will not fall to 0V, but may fall to the lowest voltage level that maintains the voltage difference Vgs_M of the p-channel transistor M lower than the second threshold voltage Vth_M.

When the power converter 100 is in a normal operation state, it means that the operating voltage Vdd is higher than the operating voltage threshold. When the operating voltage Vdd is higher than the operating voltage threshold, it means that the p-channel transistor M controls the cross voltage Vgs to always be higher than the second threshold voltage Vth_M. Therefore, when the power converter 100 is in a normal operation state, the p-channel transistor M is normally turned off without forcibly being controlled.

Specifically, since the first terminal of the driving circuit 24 is coupled to the power terminal VDD and the transistor control terminal M3, the voltage at the transistor control terminal M3 will gradually rise to the steady-state value of the operating voltage Vdd, that is, the voltage is completely built. Therefore, as long as the driving signal S_DR provided by the driving circuit 24 may be less than the operating voltage Vdd plus the second threshold voltage Vth_M, the p-channel transistor M can control the cross voltage Vgs to always be lower than the second threshold voltage Vth_M, thus avoiding the transistor M from being turned on.

Figure 4A:
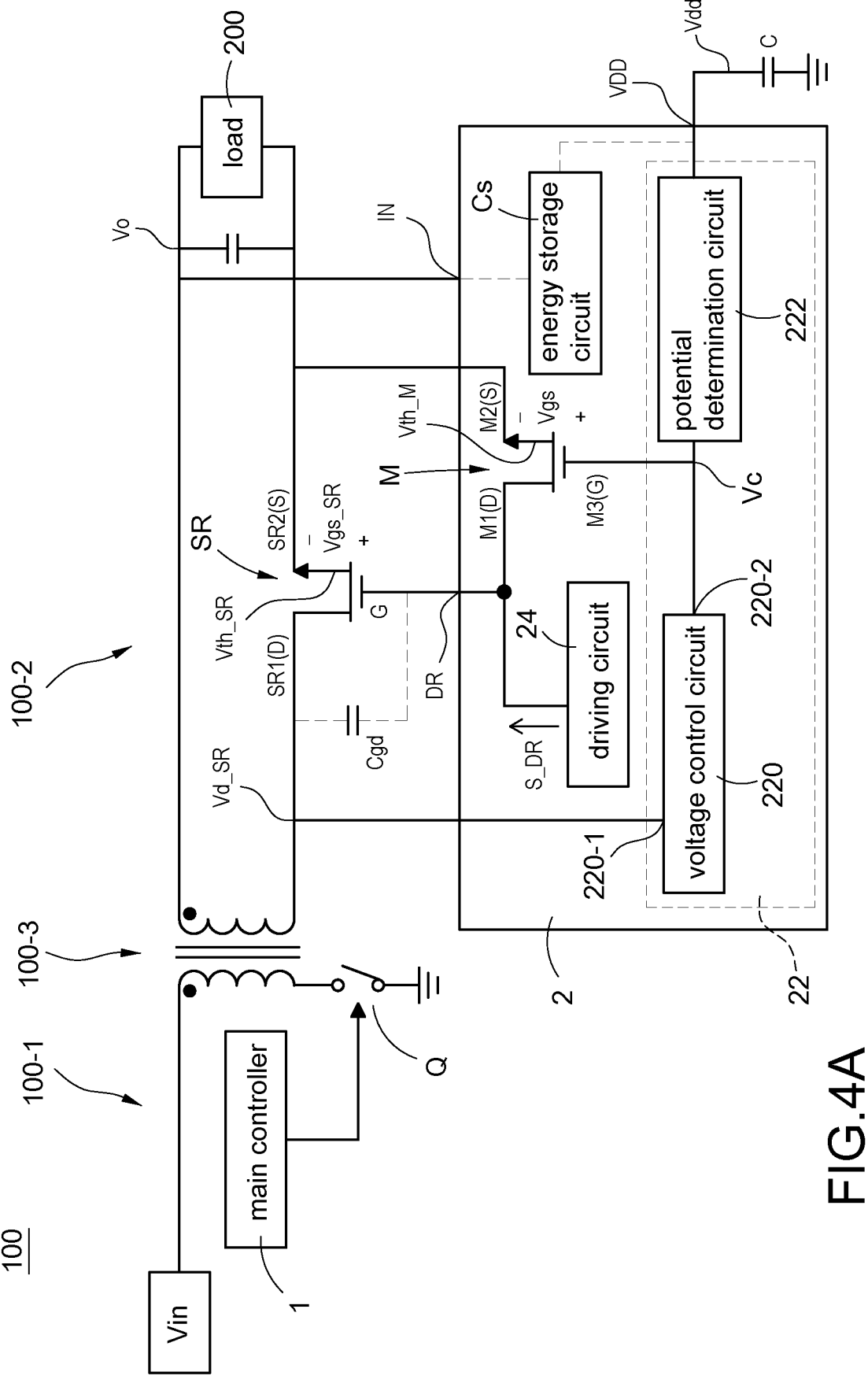
FIG. 4A is a block circuit diagram of the power converter having the synchronous rectification controller according to a second embodiment of the present disclosure.
Figure 4B:
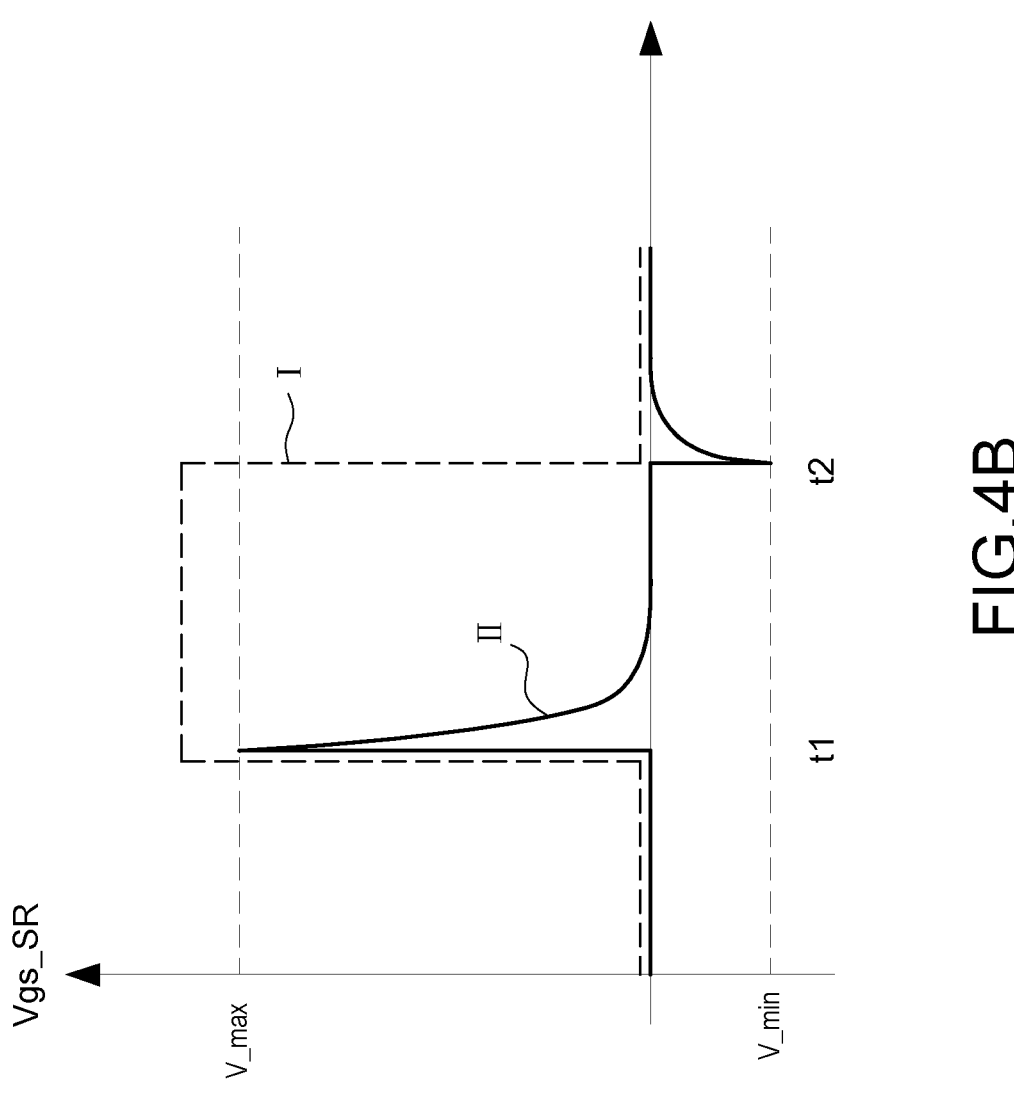
FIG. 4B is a waveform diagram of the power converter in operation shown in FIG. 4A.

Please refer to FIG. 4A, which shows a block circuit diagram of the power converter having the synchronous rectification controller according to a second embodiment of the present disclosure; please refer to FIG. 4B, which shows a waveform diagram of the power converter in operation shown in FIG. 4A, and also refer to FIG. 2 to FIG. 3B. As shown in FIG. 4A, the transistor M is a n-channel transistor, and the driving circuit 24 is disposed outside the start-up control module 22. The transistor first terminal M1 (i.e., the drain D) is coupled to the rectification switch control terminal G, and the transistor second terminal M2 (i.e., the source S) is coupled to the rectification switch second terminal SR2 (i.e., the source S). When the operating voltage Vdd is higher than the operating voltage threshold, the driving circuit 24 can provide the driving signal S_DR to the rectification switch control terminal G to selectively turn on the rectification switch SR. When the operating voltage Vdd is lower than the operating voltage threshold, the driving circuit 24 cannot provide the driving signal S_DR to drive the rectification switch SR to be turned on.

The start-up control module 22 includes a voltage control circuit 220 and a potential determination circuit 222. The voltage control circuit 220 includes an input terminal 220-1 and an output terminal 220-2. The input terminal 220-1 is coupled to the rectification switch first terminal SR1 (i.e., the drain D), and the output terminal 220-2 is coupled to the transistor control terminal M3 (i.e., the gate G). A first terminal of the potential determination circuit 222 is coupled to the transistor control terminal M3 (i.e., the gate G), and a second terminal of the potential determination circuit 222 is coupled to the power terminal VDD.

The voltage control circuit 220 receives a drain voltage Vd_SR through the input terminal 220-1, and provides a control voltage Vc corresponding to the drain voltage Vd_SR at the output terminal 220-2. In particular, the magnitude of the control voltage Vc is the same as or has a positive correlated relationship with the drain voltage Vd_SR, and the voltage control circuit 220 further limits the maximum value V_max and the minimum value V_min of the control voltage Vc to preventing the transistor M from being damaged due to the excessively high or low voltage. Therefore, the maximum value V_max and the minimum value V_min limited by the voltage control circuit 220 are determined based on specifications of the transistor M.

When the operating voltage Vdd is lower than the operating voltage threshold, and part of the energy of the input voltage Vin is coupled to the secondary-side circuit 100-2 to cause the voltage at the rectification switch first terminal SR1 (i.e., the drain D) to rise, the voltage at the rectification switch control terminal G will rise through the parasitic capacitance Cgd of the rectification switch SR. The voltage control circuit 220 receives the drain voltage Vd_SR through the input terminal 220-1, and provides the control voltage Vc positively related to the control voltage Vc of the drain voltage Vd_SR to the transistor control terminal M3 (i.e., the gate G), and therefore the control voltage Vc also has a rising voltage waveform. When the voltage difference Vgs (i.e., Vg–Vs) between the transistor control terminal M3 (i.e., the gate G) and the transistor second terminal M2 (i.e., the source S) is higher than the second threshold voltage Vth_M of the n-channel transistor M, i.e., a critical voltage Vth of the n-channel transistor M due to the rise of the control voltage Vc, the transistor M is turned on so that the rectification switch control terminal G is bypassed to the rectification switch second terminal SR2 (i.e., the source S) which is grounded, and therefore the voltage at the rectification switch control terminal G falls. Therefore, this avoids the situation where the voltage at the rectification switch control terminal G is higher than the first threshold voltage Vth_SR of the rectification switch SR, thereby causing the rectification switch SR to be mistakenly turned on. When the voltage difference Vgs (i.e., Vg–Vs) between the transistor control terminal M3 (i.e., the gate G) and the transistor second terminal M2 (i.e., the source S) is lower than the second threshold voltage Vth_M of the n-channel transistor M, i.e., the critical voltage Vth of the n-channel transistor M due to the fall of the control voltage Vc, the transistor M is turned off so that a path between the rectification switch control terminal G and the rectification switch second terminal SR2 (i.e., the source S) is disconnected.

Since the control voltage Vc at the transistor control terminal M3 (i.e., the gate G) is positively related to the drain voltage Vd_SR, when the power converter 100 is in the star-tup state, the energy transferred by the transformer 100-3 to the rectification switch first terminal SR1 (i.e., the drain D) may be affected by the parasitic capacitance of the rectification switch SR, which may cause the drain voltage Vd_SR to generate a surge (for example, during time t1 to time t2 in FIG. 4B), thereby causing the transistor M to be damaged. Therefore, the voltage control circuit 220 can avoid damage to the transistor M caused by the excessive positive voltage surge by limiting the maximum value V_max of the control voltage Vc (for example, but not limited to, at time t1). Similarly, the voltage control circuit 220 can avoid damage to the transistor M caused by the excessive negative voltage surge by limiting the minimum value V_min of the control voltage Vc (for example, but not limited to, at time t2).

As shown in FIG. 4B, the cross voltage Vgs_SR between the rectification switch control terminal G and the rectification switch second terminal SR2 (i.e., the source S) is shown. The dotted-line waveform I is the cross voltage Vgs_SR waveform of the rectification switch SR before the start-up control module 22 is added. In which, the rectification switch control terminal G is affected by the parasitic capacitance Cgd, which may cause the rectification switch SR to be mistakenly turned on. The solid-line waveform II is the wave of the rectification switch control terminal G after the start-up control module 22 is added in FIG. 4A. During time t1 and time t2, the operating voltage Vdd has not yet been built, and the cross voltage Vgs_SR of the rectification switch SR is affected by the primary-side circuit 100-1 (for example, but not limited to, turning on or turning off the power switch Q). In this situation, the cross voltage Vgs_SR rises due to the coupling of part of the energy of the transformer 100-3. Since the transistor M is the n-channel transistor, when the power converter 100 is in the start-up state, the secondary-side circuit 100-2 may have the potential at the rectification switch first termina SR1 (i.e., the drain D), and the potential of the rectification switch second terminal SR2 (i.e., the source S), which is grounded, is 0V.

In the situation that the drain voltage Vd_SR exists, the voltage control circuit 220 outputs the control voltage Vc to the transistor control terminal M3 (i.e., the gate G), and the potential of the transistor second terminal M2 (i.e., the source S) is 0V. Therefore, when the operating voltage Vdd is lower than the operating voltage threshold and the transistor M is turned on, the rectification switch control terminal G is coupled to the transistor first terminal M1 (i.e., the drain D). Even if the voltage at the rectification switch control terminal G falls to 0V, it will not affect the voltage difference Vgs of the n-channel transistor M, and the transistor M can be still turned on. Therefore, compared to FIG. 3A and FIG. 3B, after the transistor M is turned on, the n-channel transistor M shown in FIG. 4A and FIG. 4B can be continuously turned on even if the voltage at the rectification switch control terminal G falls to 0V (after time t1 shown in FIG. 4B).

When the power converter 100 is in a normal operation state, it means that the operating voltage Vdd is higher than the operating voltage threshold. When the operating voltage Vdd is higher than the operating voltage threshold, it means that the potential determination circuit 222 can determine that the operating voltage Vdd is higher than the operating voltage threshold. When the potential determination circuit 222 determines that the operating voltage Vdd is higher than the operating voltage threshold, the potential determination circuit 222 makes the voltage at the transistor control terminal G fall so that the voltage difference Vgs of the transistor M is lower than the second threshold voltage Vth_M, i.e., the critical voltage Vth of the n-channel transistor M, and therefore the transistor M is normally turned off to prevent the transistor M from being mistakenly turned on to cause the rectification switch SR to be mistakenly turned on or turned off.

Figure 5A:
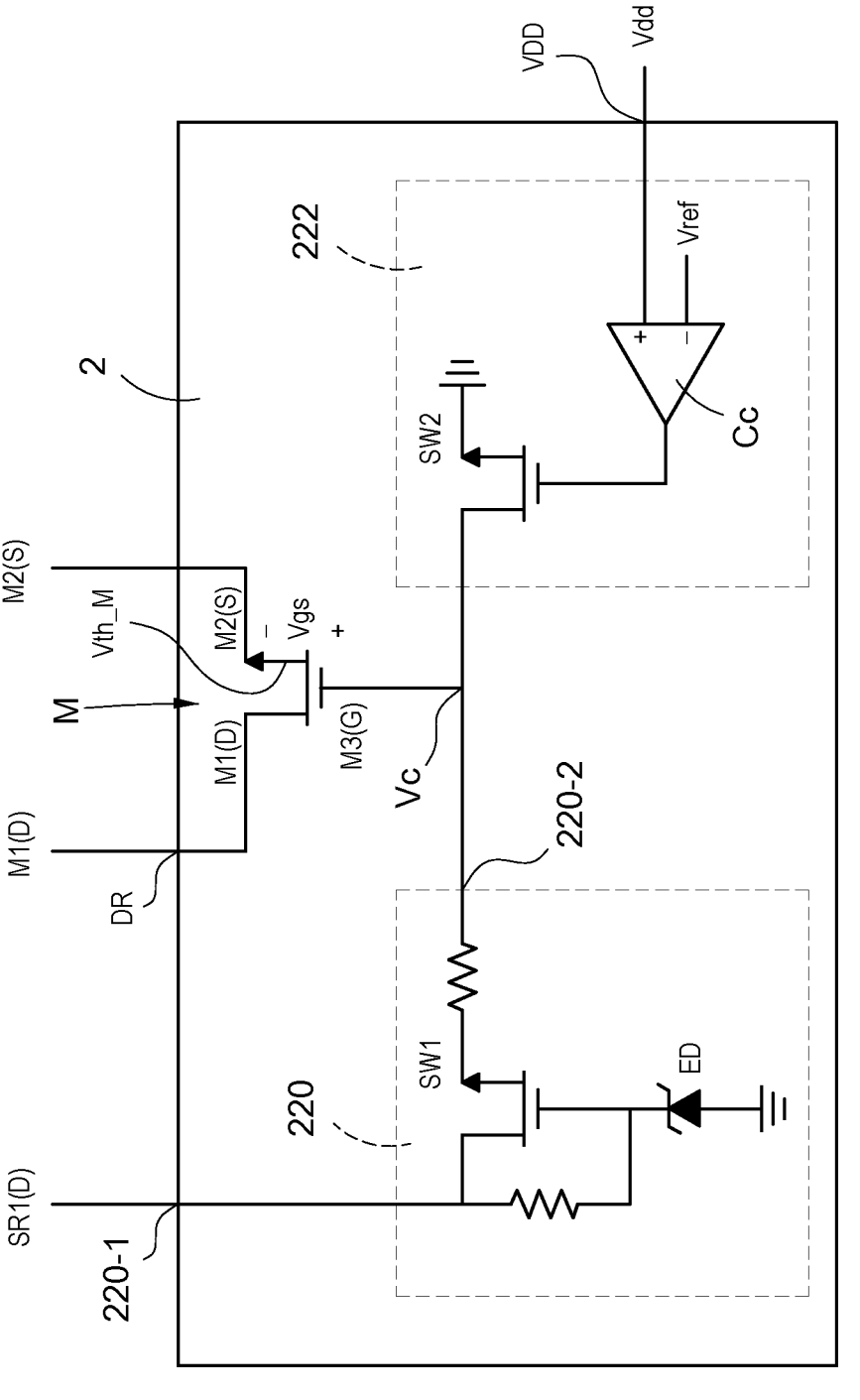
FIG. 5A is a circuit diagram of a voltage control circuit according to a first embodiment of the present disclosure.

The second embodiment of the voltage control circuit of the synchronous rectification controller of the present disclosure basically provides functions of waveform following and voltage control. Please refer to FIG. 5A, which shows a circuit diagram of a voltage control circuit according to a first embodiment of the present disclosure; please refer to FIG. 5B, which shows a circuit diagram of the voltage control circuit according to a second embodiment of the present disclosure, and also refer to FIG. 2 to FIG. 4B. As shown in FIG. 5A, the voltage control circuit 220 includes a first switch SW1 and a voltage regulator ZD. In the situation that the drain voltage Vd_SR exists at the rectification switch first terminal SR1 (i.e., the drain D), the drain voltage Vd_SR is partially coupled to the output terminal 220-2 through the first switch SW1 so that the voltage control circuit 220 provides a waveform, which follows the drain voltage Vd_SR, through the output terminal 220-2. Since the range of the drain voltage Vd_SR may significantly vary, the voltage regulator ZD is used to clamp and limit the maximum value V_max and the minimum value V_min of the control voltage Vc to prevent the control voltage Vc from changing beyond the input voltage range that the transistor control terminal G can withstand. In particular, the connection relationship between the first switch SW1 and the voltage regulator ZD is shown in FIG. 5A, and the detail description is omitted here for conciseness.

The potential determination circuit 222 includes a comparator Cc and a second switch SW2. The comparator Cc is used to compare the operating voltage Vdd and a reference voltage Vref, and then controls the second switch SW2 to be turned on and turned off based on the comparison result. Therefore, the transistor control terminal M3 (i.e., the gate G) may be grounded by turning on the second switch SW2, thereby causing the control voltage Vc to fall. In particular, the connection relationship between the comparator Cc and the second switch SW2 is also shown in FIG. 5A, and the detail description is omitted here for conciseness.

Figure 5B:
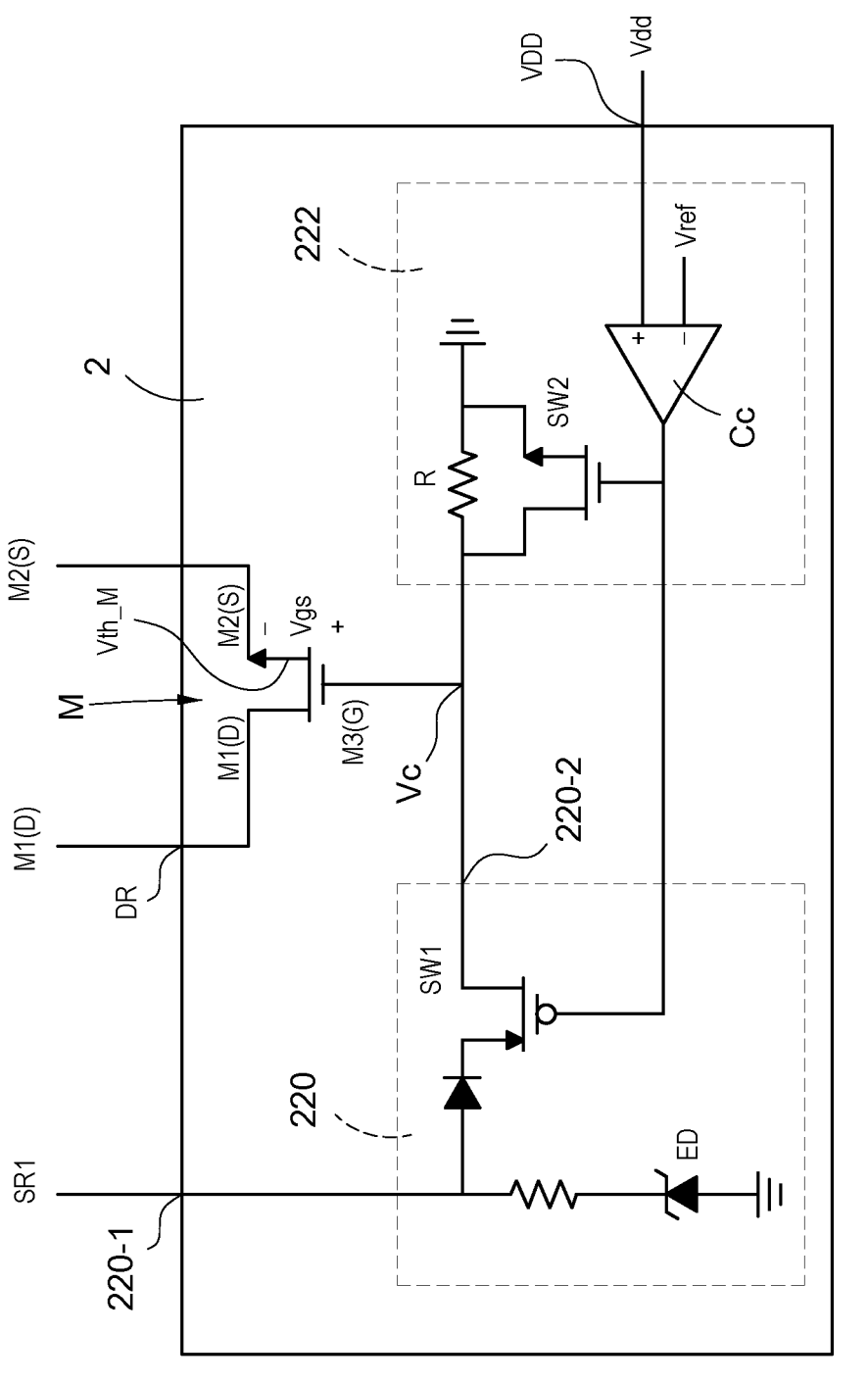
FIG. 5B is a circuit diagram of the voltage control circuit according to a second embodiment of the present disclosure.

The major difference between the voltage control circuit 220 shown in FIG. 5B and that shown in FIG. 5A is that the first switch SW1 shown in FIG. 5A is the n-channel transistor and the second switch SW2 shown in FIG. 5B is the p-channel transistor. Therefore, the connection relationship of the circuit depends on the type of switch SW, but the main spirit is the same and will not be described again here. On the other hand, the main difference between the potential determination circuit 222 in FIG. 5B and that shown in FIG. 5A is that a resistor R is added to limit a current flowing through the second switch SW2 when the second switch SW2 is turned on. In particular, the voltage control circuit 220 and the potential determination circuit 222 are only two examples of multiple circuit implementations. Therefore, as long as the operation mode and function of the voltage control circuit 220 and the potential determination circuit 222 of the present disclosure can be achieved, electronic circuits, logic circuits, or devices such as controllers controlled by software programs should be included in the scope of this embodiment.

Figure 6:
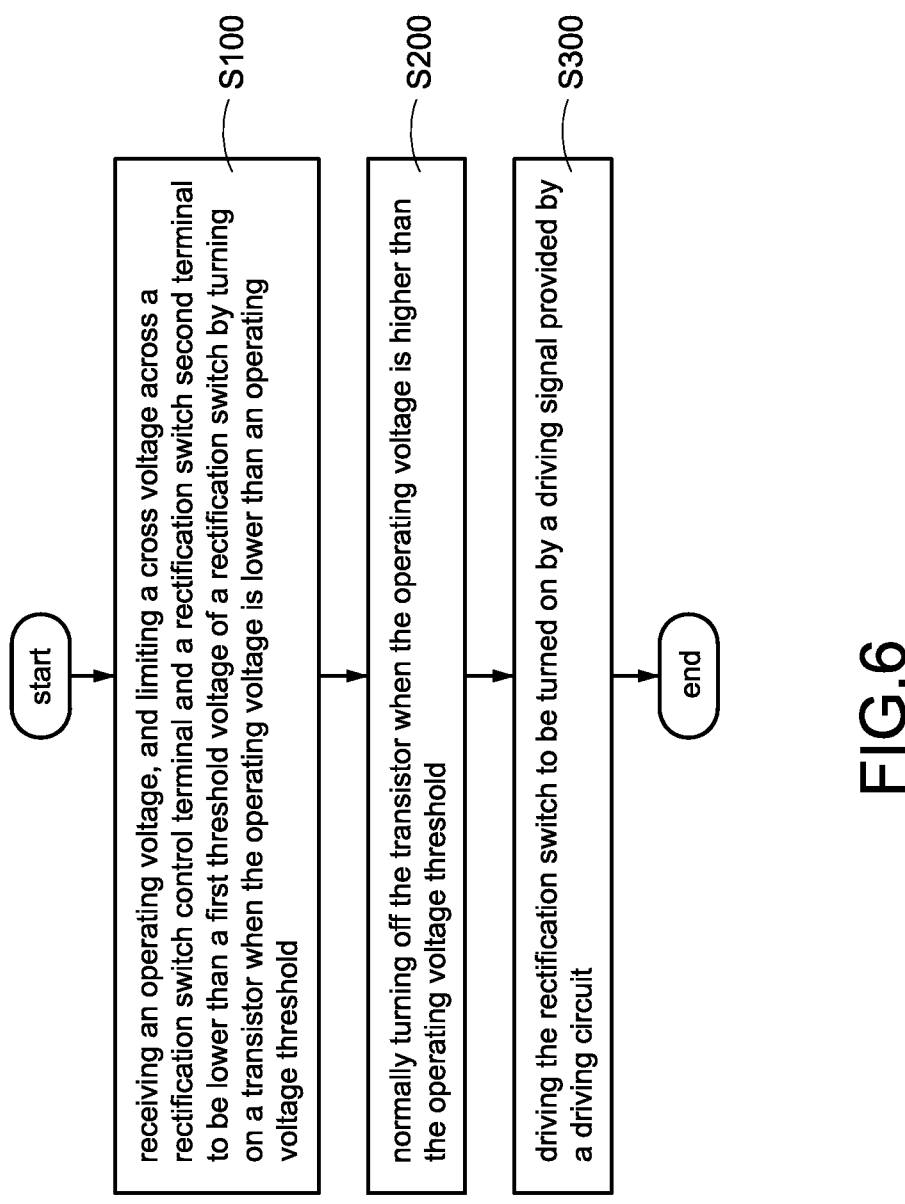
FIG. 6 is a flowchart of a start-up method for a rectification switch of a power converter in a start-up stage according to the present disclosure.

Please refer to FIG. 6, which shows a flowchart of a start-up method for a rectification switch of a power converter in a start-up stage according to the present disclosure, and refer to FIG. 2 to FIG. 5B. The start-up method for the rectification switch SR of the power converter 199 in a start-up stage is mainly to avoid the situation that when part of the energy of the primary-side circuit 100-1 is coupled to the secondary-side circuit 100-2 through the transformer 100-3, the rectification switch SR is affected by the parasitic capacitance Cgd and is mistakenly turned on. The start-up method includes steps of: first, receiving an operating voltage, and limiting a cross voltage across the rectification switch control terminal and the rectification switch second terminal to be lower than a first threshold voltage of the rectification switch by turning on a transistor when the operating voltage is lower than an operating voltage threshold (step S100). A preferred implementation executed by the start-up control module 22 is: when the operating voltage Vdd is lower than the operating voltage threshold, the cross voltage Vgs_SR between the rectification switch control terminal G and the rectification switch second terminal SR2 is limited to be lower than the first threshold voltage Vth_SR of the rectification switch SR, i.e., the critical voltage Vth of the rectification switch SR by turning on the transistor M. Therefore, the cross voltage Vgs_SR of the rectification switch SR will not be higher than the first threshold voltage Vth_SR and locked in an off state while the power converter 100 is in the start-up state, thereby preventing the rectification switch SR from being mistakenly turned on due to the influence of a parasitic capacitance Cgd.

Afterward, normally turning off the transistor when the operating voltage is higher than the operating voltage threshold (step S200). A preferred implementation executed by the start-up control module 22 is: when the operating voltage Vdd is higher than the operating voltage threshold, the transistor M is normally turns off to prevent the transistor M from being mistakenly turned on to cause the rectification switch SR to be mistakenly turned on or turned off. Finally, driving the rectification switch to be turned on by a driving signal provided by a driving circuit (step S300). A preferred implementation executed by the synchronous rectification controller 2 is: a power switch Q is switched to provide the driving signal S_DR to turn on the rectification switch SR so as to synchronously control the switching of the rectification switch SR. In particular, the detailed process steps of the start-up method for the rectification switch SR of the power converter 100 in the start-up stage can refer to FIG. 3A to FIG. 5A for details, and the detail description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A synchronous rectification controller applied to a power converter, the synchronous rectification controller coupled to a rectification switch at a secondary side of the power converter, the rectification switch comprising a rectification switch control terminal, a rectification switch first terminal, and a rectification switch second terminal, the synchronous rectification controller comprising:

a driving signal terminal, coupled to the rectification switch control terminal, a power receiving terminal, configured to receive an operating voltage, wherein when the operating voltage is higher than an operating voltage threshold, the synchronous rectification controller outputs a driving signal through the driving signal terminal, a transistor, comprising a transistor first terminal, a transistor second terminal, and a transistor control terminal, the transistor first terminal coupled to the rectification switch control terminal, and the transistor second terminal coupled to the rectification switch second terminal, and a start-up control module, coupled to the transistor control terminal and the power receiving terminal;

wherein when the operating voltage is lower than the operating voltage threshold, the transistor is turned on and a cross voltage between the rectification switch control terminal and the rectification switch second terminal is lower than a first threshold voltage of the rectification switch to prevent conduction of the rectification switch, and wherein the transistor is a p-channel transistor, and the transistor control terminal coupled to the power receiving terminal, when the operating voltage is higher than the operating voltage threshold, the operating voltage drives the voltage difference between the transistor control terminal and the transistor first terminal higher to turn off the p-channel transistor.

2. The synchronous rectification controller as claimed in claim 1, wherein the start-up control module is a driving circuit; wherein the driving circuit is coupled to the rectification switch control terminal through the driving signal terminal, and provides the driving signal to drive the rectification switch when the operating voltage is higher than the operating voltage threshold.

3. The synchronous rectification controller as claimed in claim 1, wherein the transistor is a p-channel transistor, wherein when the operating voltage is lower than the operating voltage threshold and an energy is coupled to the secondary side circuit of the power converter, the voltage at the rectification switch control terminal to rise, and will cause the voltage difference between the transistor control terminal and the transistor first terminal lower than a second threshold voltage of the p-channel transistor to turn on the p-channel transistor.

4. The synchronous rectification controller as claimed in claim 3, wherein one terminal of the start-up control module is coupled to the power receiving terminal and the transistor control terminal so that when the operating voltage is higher than the operating voltage threshold, the operating voltage drives the voltage difference to be always higher than the second threshold voltage to turn off the p-channel transistor.

5. The synchronous rectification controller as claimed in claim 4, wherein the absolute value of the second threshold voltage is lower than the absolute value of the first threshold voltage.

6. A synchronous rectification controller applied to a power converter, the synchronous rectification controller coupled to a rectification switch at a secondary side of the power converter, the rectification switch comprising a rectification switch control terminal, a rectification switch first terminal, and a rectification switch second terminal, the synchronous rectification controller comprising:

a driving signal terminal, coupled to the rectification switch control terminal, a power receiving terminal, configured to receive an operating voltage, wherein when the operating voltage is higher than an operating voltage threshold, the synchronous rectification controller outputs a driving signal through the driving signal terminal, a transistor, comprising a transistor first terminal, a transistor second terminal, and a transistor control terminal, the transistor first terminal coupled to the rectification switch control terminal, and the transistor second terminal coupled to the rectification switch second terminal, and a start-up control module, coupled to the transistor control terminal and the power receiving terminal, wherein the start-up control module comprises:

a voltage control circuit, comprising an input terminal and an output terminal, the input terminal is coupled to the rectification switch first terminal, and the output terminal is coupled to the transistor control terminal, wherein when the operating voltage is lower than the operating voltage threshold, the transistor is turned on and a cross voltage between the rectification switch control terminal and the rectification switch second terminal is lower than a first threshold voltage of the rectification switch to prevent conduction of the rectification switch, wherein the transistor is a n-channel transistor and the synchronous rectification controller further comprises a driving circuit; wherein the driving circuit is coupled to the rectification switch control terminal through the driving signal terminal, and provides the driving signal to drive the rectification switch to be turned on when the operating voltage is higher than the operating voltage threshold, wherein the input terminal receives a drain voltage, and the output terminal outputs a control voltage positive correlated to the drain voltage, when the operating voltage is lower than the operating voltage threshold and the control voltage makes the voltage difference across the transistor control terminal and the transistor second terminal higher than a second threshold voltage, the transistor is turned on, and when the operating voltage is lower than the operating voltage threshold and the control voltage makes the voltage difference lower than the second threshold voltage, the transistor is turned off.

7. The synchronous rectification controller as claimed in claim 6, wherein the voltage control circuit limits a maximum value and a minimum value of the control voltage, and the maximum value and the minimum value are determined based on specifications of the transistor.

8. The synchronous rectification controller as claimed in claim 6, wherein the start-up control module comprises:

a potential determination circuit, comprising a first terminal and a second terminal, the first terminal of the potential determination circuit is coupled to the transistor control terminal, and the second terminal of the potential determination circuit is coupled to the power receiving terminal, wherein when the potential determination circuit determines that the operating voltage is higher than the operating voltage threshold, the potential determination circuit decreases the control voltage to control the voltage difference to be lower than the second threshold voltage to turn off the transistor.

9. A start-up method for a rectification switch of a power converter in a start-up stage, the rectification switch coupled to a secondary side of the power converter, and the rectification switch comprising a rectification switch control terminal, a rectification switch first terminal, and a rectification switch second terminal, the start-up method comprising steps of:

receiving an operating voltage, and limiting a cross voltage across the rectification switch control terminal and the rectification switch second terminal to be lower than a first threshold voltage of the rectification switch by turning on a transistor when the operating voltage is lower than an operating voltage threshold, wherein the transistor is a p-channel transistor, normally turning off the transistor when the operating voltage is higher than the operating voltage threshold, driving the rectification switch to be turned on by a driving signal provided by a driving circuit, turning on the transistor when the operating voltage is lower than the operating voltage threshold and a voltage difference across the transistor first terminal and the transistor control terminal is lower than a second threshold voltage of the transistor, and driving, by the operating voltage, the voltage difference to be always higher than the second threshold voltage to normally turn off the transistor when the operating voltage is higher than the operating voltage threshold.

10. A start-up method for a rectification switch of a power converter in a start-up stage, the rectification switch coupled to a secondary side of the power converter, and the rectification switch comprising a rectification switch control terminal, a rectification switch first terminal, and a rectification switch second terminal, the start-up method comprising steps of:

receiving an operating voltage, and limiting a cross voltage across the rectification switch control terminal and the rectification switch second terminal to be lower than a first threshold voltage of the rectification switch by turning on a transistor when the operating voltage is lower than an operating voltage threshold, wherein the transistor is a n-channel transistor, normally turning off the transistor when the operating voltage is higher than the operating voltage threshold, driving the rectification switch to be turned on by a driving signal provided by a driving circuit, receiving a drain voltage of the rectification switch first terminal, and providing a control voltage corresponding to the drain voltage, turning on the transistor when the operating voltage is lower than the operating voltage threshold and a voltage difference across the transistor control terminal and the transistor second terminal is higher than a second threshold voltage due to the increase of the control voltage, and turning off the transistor when the operating voltage is lower than the operating voltage threshold and the voltage difference is lower than the second threshold voltage due to the decrease of the control voltage.

11. The start-up method as claimed in claim 10, further comprising a step of:

limiting a maximum value and a minimum value of the control voltage based on specifications of the transistor.

12. The start-up method as claimed in claim 10, further comprising steps of:

determining whether the operating voltage is higher than the operating voltage threshold, and normally turning off the transistor when the operating voltage is higher than the operating voltage threshold and the voltage difference is lower than the second threshold voltage due to the decrease of the control voltage.

\* \* \* \* \*